United States Patent
Ocvirk et al.

(10) Patent No.: US 7,156,118 B2
(45) Date of Patent: Jan. 2, 2007

(54) MICROFLUIDIC SYSTEM WITH HIGH ASPECT RATIO

(75) Inventors: Gregor Ocvirk, Mannheim (DE); Carlo Effenhauser, Weinheim (DE); Karl-Heinz Koelker, Gruenstadt (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 10/525,400

(22) PCT Filed: Aug. 21, 2003

(86) PCT No.: PCT/EP03/09263

§ 371 (c)(1), (2), (4) Date: Feb. 23, 2005

(87) PCT Pub. No.: WO2004/018101

PCT Pub. Date: Mar. 4, 2004

(65) Prior Publication Data

US 2006/0124184 A1 Jun. 15, 2006

(30) Foreign Application Priority Data

Aug. 23, 2002 (DE) .............................. 102 38 825

(51) Int. Cl.
*F16K 51/00* (2006.01)
*F15C 1/06* (2006.01)

(52) U.S. Cl. ........................... 137/15.18; 137/3; 137/7; 137/833

(58) Field of Classification Search ................... 137/3, 137/7, 15.18, 833; 922/856; 422/100; 204/600
See application file for complete search history.

(56) References Cited

U.S. PATENT DOCUMENTS

| | | | |
|---|---|---|---|
| 4,233,029 A | 11/1980 | Columbus | |
| 4,908,112 A * | 3/1990 | Pace | ........................ 210/198.2 |
| 5,842,787 A * | 12/1998 | Kopf-Sill et al. | ........... 366/340 |
| 6,051,866 A | 4/2000 | Shaw et al. | |
| 6,068,684 A | 5/2000 | Overton | |
| 6,186,660 B1 | 2/2001 | Kopf-Sill et al. | |

(Continued)

FOREIGN PATENT DOCUMENTS

EP 0394738 A2 10/1990

(Continued)

OTHER PUBLICATIONS

Bebbe, D. et al., "Functional hydrogel structures for autonomous flow control insided microfluidic channels," Nature, vol. 404, Apr. 2000, p. 588-590.

(Continued)

*Primary Examiner*—A. Michael Chambers
(74) *Attorney, Agent, or Firm*—Marilyn L. Amick; Roche Diagnostics Operations, Inc.

(57) ABSTRACT

The invention relates to the technical field of microfluidic channel structures. The invention discloses a microfluidic channel system with a high aspect ratio as well as a process for producing the microfluidic system. The process according to the invention enables the production of channel structures with aspect ratios of any magnitude without the process being limited by the manufacturing conditions to certain materials for the channel system. The channel system can thus be optimally adapted to a desired field of application.

22 Claims, 6 Drawing Sheets

U.S. PATENT DOCUMENTS

| | | | |
|---|---|---|---|
| 6,200,737 B1 | 3/2001 | Walt et al. | |
| 6,210,968 B1 | 4/2001 | Arnold et al. | |
| 6,251,248 B1 | 6/2001 | Lin | |
| 6,287,520 B1* | 9/2001 | Parce et al. | 422/100 |
| 6,290,685 B1 | 9/2001 | Insley et al. | |
| 6,368,871 B1 | 4/2002 | Christel et al. | |
| 6,409,072 B1 | 6/2002 | Breuer et al. | |
| 6,676,835 B1* | 1/2004 | O'Connor et al. | 210/542 |

FOREIGN PATENT DOCUMENTS

| | | |
|---|---|---|
| WO | WO 99/36941 | 7/1999 |
| WO | WO 01/17797 A1 | 3/2001 |
| WO | WO 01/43875 A1 | 6/2001 |

OTHER PUBLICATIONS

Bowden, N. et al., "Self-Assembly of Mesoscale Objects into Ordered Two-Dimensional Arrays," Science, vol. 276, Apr. 11, 1997, p. 233-235.

Breen, T. et al., "Design and Self-Assembly of Open, Regular, 3D Mesostructures," Science, vol. 284, May 7, 1999; p. 948-951.

Cheng, S. et al., "Integrated Serial Dilution on a Microchip for Immunoassay Sample Treatement and Flow Injection Analysis,," Chemistry Department, University of Alberta, Edmonton, Alberta, Canada T6G 2G2, pp. 157-161.

Cifuentes, A. et al., "Rectangular Capillary Electrophoresis: Some Theoretical Considerations," Chromatographia, Bol. 39, No. 7/8, Oct. 1994, p. 391-405.

Dertinger, S. et al., "Generation of Gradients Having Complex Shapes Using Microfluidic Networks," Anal. Chem. 2001, 73, 1240-1246, Effenhauser, C. et al., "Manipulation of Sample Fractions on a Capillary Electrophoresis Chip," Anal. Chem. 1995, 67, 2284-2287.

Fluri, K. et al., "Integrated Capillary Electrophoresis Devices with an Efficient Postcolumn Reactor in Planar Quartz and Glass Chips," Anal. Chem. 1996, 68, 4285-4290.

Fouckhardt, H. et al., "Micro flow modules with combined fluid flow channel and optical detection waveguide- hyper Rayleigh scattering as a case study," Fresenius J. Anal. Chem. (2001) 371:218-227.

Gavin, P. et al., "Continuous Separations with Microfabricated Electrophoresis—Electrochemical Array Detection," J. Am. Chem. Soc. 1996, 118, 8932-8936.

Giddings, J. "Field-Flow Fractionation: Analysis of Macromolecular, Colloidal, and Particulate Materials," Science, vol. 260, Jun. 4, 1993, p. 1456-144.

Goldman, D. et al., "Miniaturized spectrometer employing planar waveguides and grating couplers for chemical analysis," Applied Optics, vol. 29, No. 31, Nov. 1, 1990, p. 4583-4589.

Hadd, A. et al., "Microchip Device for Performing Enzyme Assays," Anal. Chem. 1997, 69, 3407-3412.

Kamholz, A. et al., "Quantitative Analysis of Molecular Interaction in a Microfluidic Channnel: The T-Sensor," Anal. Chem., 1999, 71, 5340-5347.

Kutter, J. et al., "Integrated Microchip Device with Electrokinetically Controlled Solvent Mixing for Isocratic and Gradient Elution in Micellar Electrokinetic Chromatography," Anal. Chem. 1997, 69, 5165-5171.

Liang, Z. et al., "Microfabrication of Planar Absorbance and Fluorescence Cell for Integrated Capillary Electrophoresis Devices," Anal. Chem. 1996, 68, 1040-1046.

Liu, M. et al., "Channel Electrophoresis for Kinetic Assays," A. Chem. 1996, 68, 2471-2476.

Liu, R. et al., "Passive Mixing in a Three-Dimensional Serpentine Microchannel," Journal of Microelectromechanical Systems, vol. 9, No. 2, Jun. 2000, p. 190-197.

Ocvirk, G., "Electrokinetic control of fluid flow in native poly(dimethylsiloxane) capillary electrophoresis devices," Electorophoresis 2000, 21, 107-115.

Roulet, J. et al., "Microlens systems for fluorescence detection in chemical Microsystems," Opt. Eng. 40(5) 814-821 (May 2001).

Rowe, C. et al., "An Array Immunosensor for Simultaneous Detection of Clinical Analytes," Anal. Chem. 1999, 71, 433-439.

Soper, S. et al., "Polymetric Microelectromechanical Systems," Anal. Chem., 643 A-651A (Oct. 2000).

Verpoorte, E. et al., "Three-dimensional micro flow manifolds for miniaturized chemical analysis systems," J. Micromech. Microeng. 4 (1994) 246-256.

Yang, J. et al., "Cell Separatoin on Microfabricated Electrodes Using Dielectrophoretic/Gravitational Filed-Flow Fractionation," Anal.Chem. 1999, 71, 911-918.

* cited by examiner

MICROFLUIDIC SYSTEM WITH HIGH ASPECT RATIO

FIELD OF THE INVENTION

The invention relates to the technical field of microfluidic channel structures and the production of microfluidic channel structures which prove to be particularly problematic in the case of fluidic channels with a high aspect ratio.

BACKGROUND OF THE INVENTION

Microfluidic systems are nowadays used in many technical fields. Microfluidic systems are used especially in the field of modern analytical methods. Modern analytical methods are characterized among others by the fact that only small amounts of sample are used for the analysis and hence the analytical systems prove to be economical with regard to active substances and are environmentally friendly. However, often only small amounts of sample are available for analysis thus requiring sample handling frequently in the range of a few microliters. Furthermore efforts are for example being made in the medical or diagnostic field to substantially minimize the amounts of sample. This should spare the patient from withdrawals of excessive amounts of body fluids such as for blood collection.

An essential prerequisite for handling small amounts of sample is among others that it must be possible to predetermine an exactly defined microstructure for sample processing. This is for example important for determining the concentration of an analyte in a sample since in this case a sample volume must often be defined on the basis of the microstructure.

However, when manufacturing microfluidic systems it turns out that, due to the manufacturing process, they frequently do not have exactly defined channel structures or cause so-called dead volumes depending on the manufacturing method e.g. branching sites of channels. In this case a portion of a fluid which is referred to as a dead volume is present in channel areas through which the flowing fluid does not pass due to channel branches or connections. Hence fluid located there is no longer available for the actual use once it is enclosed in this channel area. Determinations of concentration to mention only one example would thus be erroneous.

Microstructures which are particularly difficult to manufacture are in particular microfluidic systems with a high aspect ratio which are recently being used more and more frequently. A characteristic of microfluidic channels with a high aspect ratio is that they have a large depth which is aimed to be in a range of up to a few centimetres despite a small width in the range of only a few micrometers. An example of an application for channels with a high aspect ratio is for example filtration processes in which a filter material is located within a channel. When a sample is added to the channel, a filtrate forms in the lower region of the channel, for example due to the force of gravity, and can be collected there. In this case it is important that, on the one hand, the channel is characterized by an adequate depth in order that the filtration process can run to completion. On the other hand, the channel should only have a small width to ensure that the sample volume is minimized. An example of such filtration processes is the field of plasma isolation from blood. In this case the blood corpuscles are retained in the filter material in the upper region of the channel while the plasma can be isolated as a filtrate in the lower region of the channel. In principle numerous applications are conceivable and can in particular be in the field of sample preparation and in which particulate material such as sample components bound to particles is removed from the other sample components.

Another field of application for microfluidic channel systems with a high aspect ratio is the field of preparing liquid mixtures. In this case a wide variety of possible applications is also conceivable which require an effective mixing of small volumes of sample. Examples are the preparation of enzyme-substrate mixtures or in general the mixing of reagents and sample in which a small sample and/or reagent consumption plays an important role and hence the use of microstructures is particularly advantageous in this case. In general the use of microstructures with a high aspect ratio proves to be advantageous for example in the preparation of elution gradients, dilution series or concentration gradients to mention only a few examples as soon as only small fluid volumes are used.

Additional examples of application also arise from the field of analysing reaction products whose formation is initiated by mixing substances as well as analysing their kinetics. In order to measure kinetics it is important in this connection that the various substances which react with one another are immediately and completely mixed in order that one can assume that the start of the reaction is uniform for the entire sample.

It is of course also conceivable that the microfluidic structures result in a separation of complex samples or that such channel structures result in a continuous removal of a sample for analysis. This can for example enable a simultaneous determination of a plurality of analytes with a single sample application by simultaneously dividing the sample among several test fields by means of a selected fluid guidance.

In principle a variety of possible applications are conceivable especially for microstructures with a high aspect ratio. An integration of microfluidic channel systems is unavoidable especially in the field of modern analysis in which microstructural elements are often already used. Examples of this are microdialysis systems that are for example used to determine glucose in diabetics.

Hence many methods have been disclosed in the prior art for producing microfluidic systems with a high aspect ratio as well as methods for their use.

The patent U.S. Pat. No. 6,251,248 discloses an example of a microstructure which is formed as a result of a controlled swelling of a polymeric material. The system can be formed in a controlled manner by a controlled current flow by using an electrolytic solution and an ionomeric polymer. Furthermore microstructures are disclosed in the documents U.S. Pat. Nos. 6,068,684 and 6,051,866 which are manufactured by means of etching processes and irradiation. Various variants of etching and irradiation can be used which are for example known from structured exposures in the field of photosensitive coatings. The document WO 99/36941 uses the pattering of metal among others to produce microstructures.

All of the said methods of the prior art have the disadvantage that the manufacturing process makes particular requirements on the material for the microstructure depending on the selected process. Often it is difficult to exactly control the process for forming a channel and hence it is often not possible to ensure a uniform shaping of the channel structure. This is for example frequently the case in etching processes in which widening can occur in the upper region of the channel structure, whereas the lower channel end is tapered. Hence it is often the case that the manufacturing method imposes limitations on the production of a channel having a desired depth and thus on the selection of the aspect ratio which cannot be selected to be of any magnitude. Common processes in the prior art usually allow aspect ratios of <3. In addition the processes are often complicated so that high costs are incurred not only as a result of the materials necessary for the process but also due to the manufacturing processes themselves. Furthermore especially in the case of mixing liquids it turns out that, due to the manufacturing technology, the channel structures provided for this have, as already described, a low aspect ratio for a given cross-sectional area and hence for example the mixing of different samples is incomplete and slowed down. However, the selection of materials in accordance with the manufacturing process also limits the application of the respective microstructure. For example the channel walls of a microstructure that has been manufactured monolithically by means of stereolithography have very rough surfaces making it impossible to microscopically observe the microfluidic structure. Hence it would be impossible to use a microstructure manufactured in this manner in the analytical field in which for example it is intended to optically detect a fluid in the channel.

SUMMARY OF THE INVENTION

The present invention relates to a channel system for microfluidic flow having at least three fluidic connections through which a fluid can flow in or out, the system comprising a first body having at least two surfaces, a second body having at least two surfaces, and a third body having at least two surfaces, wherein the first body is joined to the second body by a first means such that a first channel is formed between a first surface of each of the first and second bodies and wherein the first channel is fluidically sealed on two edges and has a defined width or distance between the two first surfaces and a defined depth, and wherein the third body is joined to the first and second bodies by a second means such that a second channel is formed between a first surface of the third body and a second surface of the first and second bodies, wherein the channel is fluidically sealed on two edges and has a defined width and depth, and further wherein the second channel crosses the first channel, thereby providing a system having three fluidic connections, characterized in that the width each channel is less than 1 mm and the ratio of the depth to width of at least one of the channels is greater than 3.

The present invention also relates to a process for producing a channel system for microfluidic flow having at least three fluidic connections through which a fluid can flow in or out, the system comprising joining a first body having at least two surfaces to a second body having at least two surfaces by a first means whereby a first channel is formed between a first surface of each of the first and second bodies and wherein the first channel is fluidically sealed on two edges and has a defined width or distance between the two first surfaces and a defined depth, and joining a third body to the first and second bodies by a second means such that a second channel is formed between a first surface of the third body and a second surface of the first and second bodies, wherein the channel is fluidically sealed on two edges and has a defined width and depth, and further wherein the second channel crosses the first channel, thereby providing a system having three fluidic connections, characterized in that the width each channel is less than 1 mm and the ratio of the depth to width of at least one of the channels is greater than 3.

DETAILED DESCRIPTION OF THE INVENTION

The object of the invention is to provide a microfluidic system with a high aspect ratio as well as a process for producing such a system which overcomes the described disadvantages of the prior art.

The invention comprises a channel system for microfluidic flows with a large aspect ratio. The channel system has a first and a second body which are connected to one another in such a manner that a first surface of the first body and a second surface of the second body are at a defined distance from one another thus forming a first fluidic channel between the first and the second surfaces. The channel system additionally comprises a third body which is also connected to the said two bodies or to another body also in such a manner that a third surface of the third body is at a defined distance from another surface of each of the two bodies thus forming a second fluidic channel between the third surfaces and the two additional surfaces. The channel system formed in this manner is characterized in that the first channel crosses the second channel so that the channel system comprises at least three fluidic connections through which a fluid can flow in and/or out.

The channel system according to the invention is characterized by a simple and economical manufacturing process. The materials of the bodies can be freely selected and can be adapted to the respective intended field of application. The bodies preferably have a surface finish having a low degree of roughness compared to the defined distance between the surfaces which in the following is also referred to as channel width. The surface finish is also advantageously characterized in that it is inert towards the fluids that are to be used.

The manufacturing process according to the invention enables the depth of the channel to be freely selected by the dimensions of the body surfaces and the width of the channel to be freely selected by the selection of the defined distance between two surfaces. In comparison to the prior art, this enables the aspect ratio to be selected to be of any magnitude and indeed aspect ratios of >10 or even >100 can be achieved for the device according to the invention.

The microfluidic channel structures according to the invention are additionally characterized by the ability to select an exactly defined structure which enables two channels to cross without forming a dead volume at the crossing points.

The term fluidic connection in the sense of the invention is defined in more detail by the direction of fluid flow so that, depending on the flow direction, a fluidic connection can also be referred to as an inlet or outlet. In this connection a channel system according to the invention can of course have several directions of flow which in the following are also referred to as flow direction. Thus the direction of flow changes depending on the geometric orientation of the respective channel. The channel system according to the invention is designed such that it has at least three fluidic connections that are fluidically connected to one another. However, in principle the channel system can comprise any number of channels as well as of inlets and outlets where at least some of the channels cross. As already described the width of the channels is defined by the spacing of the surfaces of the respective bodies and can be selected to be almost as small as desired and for example down to the range of a few micrometers. The size of the bodies i.e. the lateral lengths of the surfaces of two surfaces that are connected together which determine the depth of the channel and are preferably essentially perpendicular to the flow direction of the fluid enables a free selection of any desired depth for the channel system thus enabling depths of several centimetres without problems. Consequently the channel system according to the invention can readily achieve aspect ratios of >3 compared to the prior art. As described any desired forms of channel crossings can be formed by the joining of the bodies without a dead volume being created.

Embodiments of crossing channels in the form of a T, Y or crosspiece are mentioned as examples. When mixing liquids the channel system according to the invention shows that it is readily possible to directly mix fluids. Furthermore, the use of crossing channels with a high aspect ratio considerably promotes the mixing of fluids since, in contrast to a channel system with a low aspect ratio, the time until a complete intermixing has occurred is reduced for a given cross-sectional area. This is explained by the enlargement of the "contact surfaces" of the adjoining channels and is further elucidated in the following on the basis of figures.

Advantageous embodiments of the channel system preferably have the said crossing structures.

If the channel system comprises three bodies of which two bodies are already connected to form a microfluidic channel, the third body is for example connected to one surface of each of the first and the second body in such a manner that the crossing channels essentially form a T-piece or a Y-piece. If the channel system additionally comprises a fourth body such that the third body is connected to one surface of the first and to one surface of the fourth body, and an additional surface of the fourth body is connected to an additional surface of the second body, the crossing channels essentially form a crosspiece. The shape of the channel structure can in principle be freely selected such that any number of possibilities are conceivable. Hence depending on the arrangement and shape of the bodies, it is possible to form any form of crossing channels. In order to obtain the highest possible aspect ratio in a preferred embodiment the distances between the surfaces of the bodies are less than 1 mm, where the side lengths of the connected surfaces that are essentially perpendicular to the flow direction preferably have a length of >1 cm so that a corresponding depth of the channel is formed by this side length. In some fields of application such as filtration processes it turns out that the side lengths of the bodies that determine the depth of the channel can also be aligned parallel to the flow direction. Fluid then flows along the channel depth which may prove to be advantageous for example in separation methods which utilize the force of gravity. In general an advantageous embodiment of the channel system is characterized in that the side lengths of the surface which determine the depth of the channel are many times larger than the defined distance between the surfaces resulting in a large aspect ratio. The aspect ratio of at least one channel in the channel system is preferably >3. The surfaces which border the channel preferably have a planar form so that the channel formed between the surfaces is as flat as possible. This means that the roughness of the surfaces is selected to be as low as possible relative to the intended channel width. In an advantageous embodiment the channel system has connecting elements which represent elements that are independent of the bodies to be connected and are the means by which the respective bodies are joined. These connecting elements preferably have a constant thickness so that the resulting channel width is also constant. For example such connecting elements are formed from a foil which for example has a thickness of <100 µm. It is preferred according to the invention that the connecting elements are only used as spacers during the manufacturing process to guarantee a uniform distance between the surfaces of the bodies and are removed again from the channel system after the bodies have been joined. It is for example possible to join the bodies together by an adhesive.

The adhesive can serve as a connecting element itself and enable a defined distance between the surfaces when it is applied uniformly. It is, however, also conceivable that the adhesive is used to join the connecting elements to the respective surfaces. The adhesive is preferably such that this results in a fluidic sealing of the channel system the adhesive being inert towards the fluids that are intended to be used.

The surfaces of the bodies that each border a channel preferably have an essentially equal surface measure so that the bodies can be optionally adapted to the desired channel structure. Other preferred embodiments relate to the selected field of application of the microfluidic system. If, for example, a separation medium is present in at least one channel, it is for example possible to, on the one hand, separate samples and reaction mixtures and, on the other hand, to carry out filtrations. If for example, the force of gravity is used in filtration processes to collect a filtrate, the fluid in such applications flows along the channel depth. In this area of the channel system the side length of the bodies which determines the depth of this channel is then parallel to the flow direction. The integration of additional structural elements into the channel system also proves to be advantageous in the field of optics. In this case the integration of microoptical systems such as microlenses, reflecting surfaces such as mirrors and/or photodiodes for example enables analytes to be optically detected in microchannels.

For example the required adjusting accuracy when coupling in excitation radiation can be reduced by integrating focussing lenses into the channel bordering walls, or the optical path length for absorption and fluorescence detection can be increased by integrating at least two reflecting surfaces into the channel bordering walls resulting in an increase in the sensitivity of the measurement. Such integrations of structural elements for example enable a portable use of the instrument since the adjusting accuracies are reduced. Furthermore it is possible to carry out spectrometric measurements in the microchannels by for example simultaneously exciting and detecting analytes in the channel system. In this case it is for example conceivable to detect analytes immobilized on the channel walls to mention only a few examples.

Furthermore a valve function can be realized in microchannels by inserting media whose volume can for example be actuated chemically. Control of flows by valve functions in microfluidic structures is for example advantageous when it is intended to temporarily separate channel segments in order to for example fluidically isolate injection solutions and reaction mixtures.

It is also possible that at least two surfaces of the bodies of the channel system have different physical and/or chemical properties so that the channel system can be optimally adapted to the respective field of application. This relates for example to properties of the surface such as transparency or conductivity as well as to properties of the materials of the bodies themselves such as electrical and thermal conductivity. If, a bordering wall of a microchannel is characterized for example by magnetizable properties, particles are retained on the channel wall after the microchannel has been loaded with magnetic particles. Such an application is for example beneficial in assays which use magnetic particles as an exchangeable surface and carriers of reagents such as antibodies. In this manner it is possible to use suitable washing processes to elute specifically bound sample components with a suitable washing solution.

If the channel system is able to specifically change the temperature of a body, this for example enables a liquid movement to be induced towards a cooler wall element by locally heating a wall element. In the case of a thermally-induced movement the relationship between surface tension and temperature is utilized.

Another subject matter of the invention is a process for producing microfluidic channel systems with a large aspect ratio, preferably with an aspect ratio of more than 10. The process comprises connecting a first surface of a first body to a second surface of a second body in such a manner that there is a defined distance between the first and the second surface and a fluidic channel is formed between these surfaces. This process is repeated with a third surface of a third body which is connected to another surface of the second body or of another body. The bodies are connected together by means of their surfaces also in such a manner that there is a defined distance between the surfaces of the bodies such that a fluidic channel system comprising at least two crossing channels is formed and the channels cross in such a manner that the channel system comprises at least three fluidic connections through which a fluid can flow in or out. Preferred embodiments of the process are derived as already described.

The invention is described in more detail in the following on the basis of some examples without hereby being limited to the described embodiments.

Figure 1A:
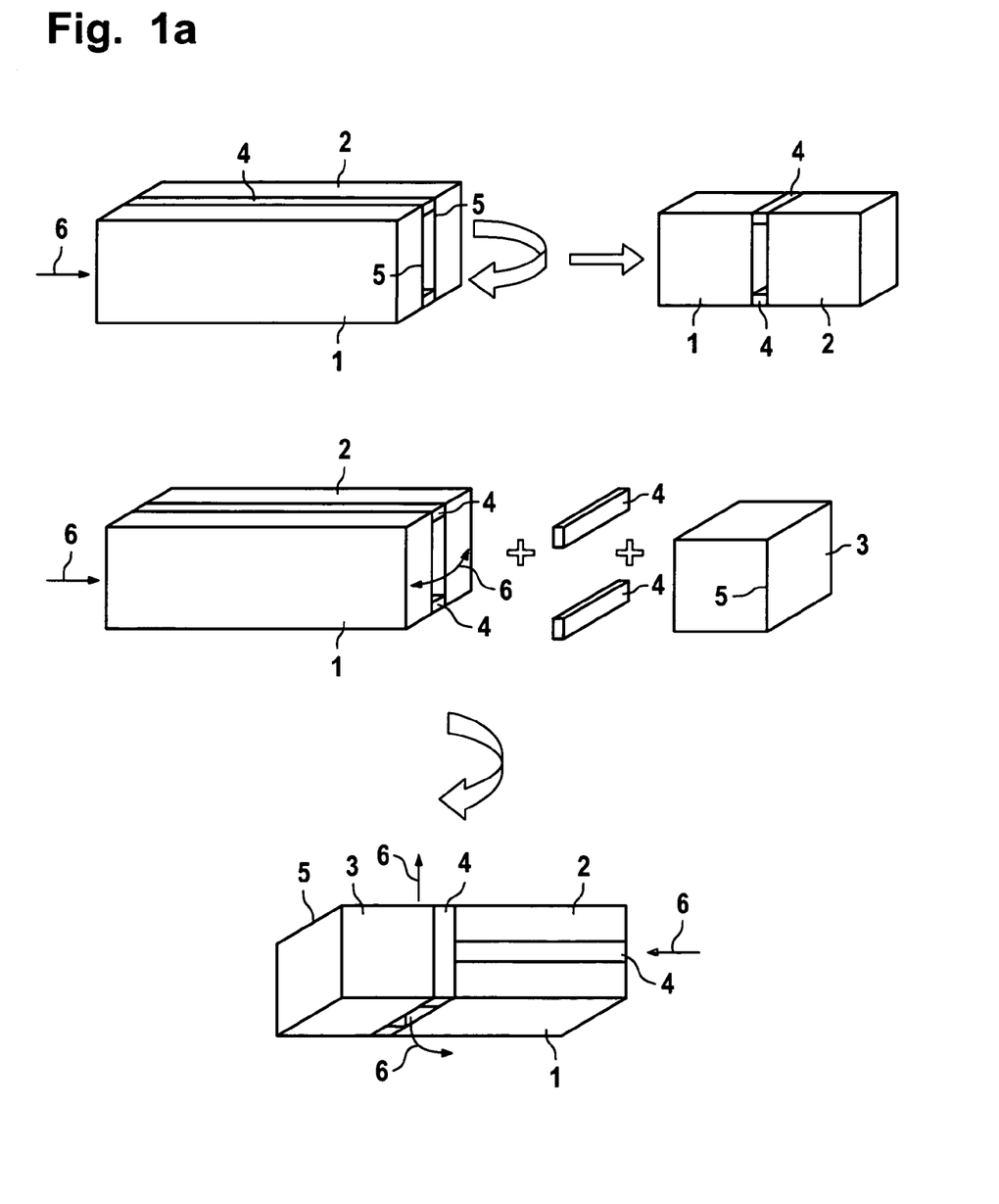
FIG. 1: Production of a microfluidic channel structure with spacers.

FIGS. 1a to e show as an example the production of a microfluidic channel system with two or more channels. In FIG. 1a 3 bodies (1–3) are assembled to form a channel system. For this the surface of the body (1) is connected by connecting elements (4) to a surface of the body (2). The connecting elements enable the spacing of the two surfaces of bodies 1 and 2 to be defined by the thickness of the connecting elements (4). The connecting elements (4) are joined by an adhesive to the respective surfaces, the adhesive also resulting in a fluidic sealing. Hence the bodies 1 and 2 form a fluidic channel between themselves which is bordered at each upper and lower end by the connecting elements (4). The depth of the channel is defined by the edge length (5) of the bodies which runs perpendicular to the flow direction (6). On the basis of the figure it is possible to simply illustrate that, depending on the selection of bodies 1 to 3 and of the connecting elements (4), it is possible to form an aspect ratio of a channel of any desired dimension. Care must only be taken that the connection of the connecting elements and bodies e.g. by a resin is such that the channel ends joined in this manner are impermeable to a fluid. The adhesive that is used should additionally advantageously already make a reliable seal when using small amounts so that the channel width is not enlarged by the additional application of the adhesive. In this case care should also be taken that the adhesive is distributed uniformly.

In an additional step a third body (3) is connected to another surface of each of the bodies 1 and 2 by means of two further connecting elements (4). The channel structure formed in this manner forms a T-piece in which a first channel formed by the bodies (1 and 2) crosses a second channel formed by the bodies 1, 2 and 3.

FIG. 1a illustrates as an example the simplicity of the process. Use of the bodies (1–3) which are macrobuilding blocks makes the handling of this manufacturing process particularly simple.

Figure 1B:
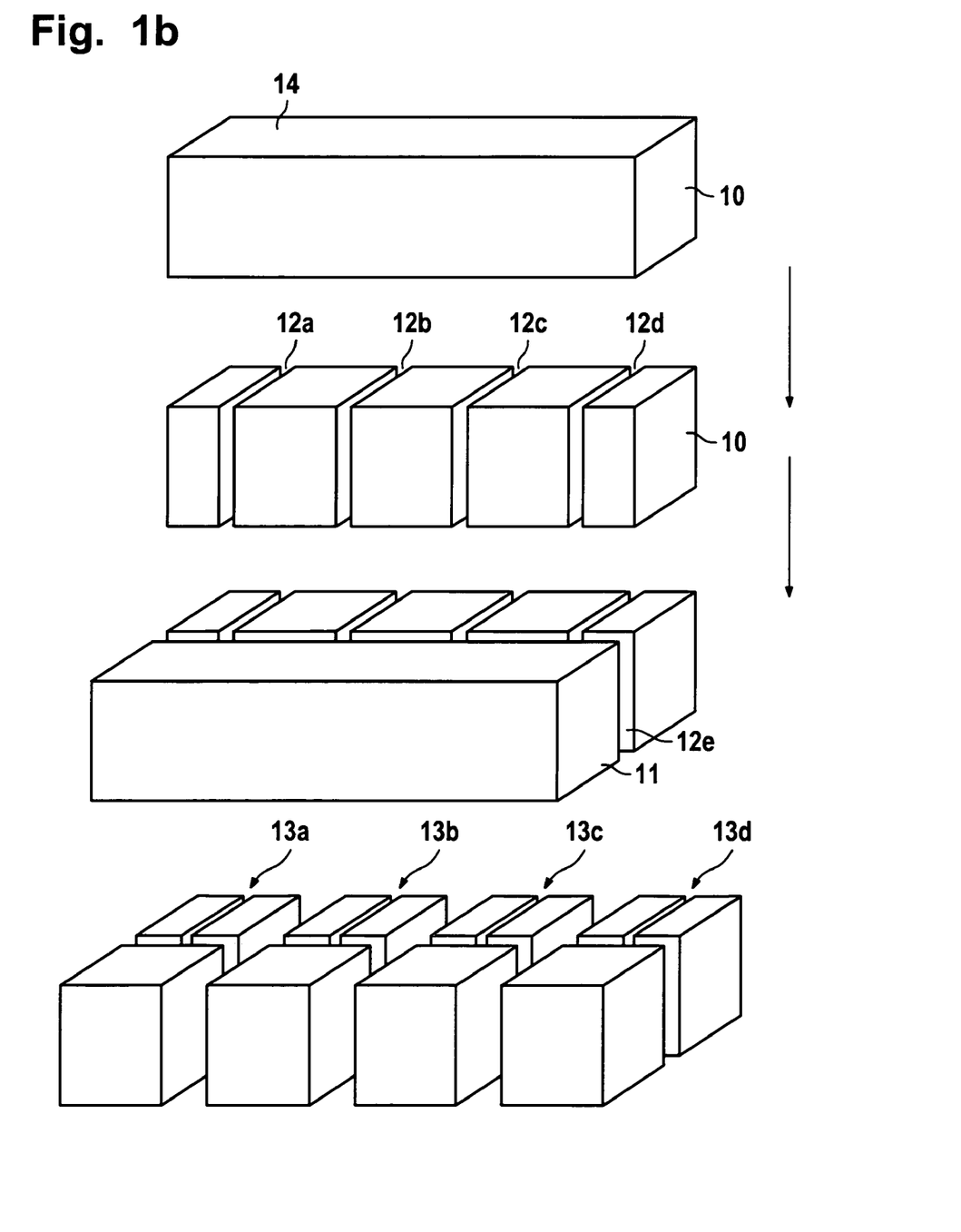

A further simplification of the manufacture of the illustrated microfluidic structure is shown as an example in FIG. 1b. In this case several channel structures in a T-form are produced simultaneously. Two bodies (10 and 11) of almost identical size are used in the production process. In a first step the body (10) is cut such that several bodies are formed of a desired size. The cutting lines (12a–d) of the body (10) form the channels in the subsequent channel system. For this purpose the individual bodies are each connected together in the upper and lower area of the cutting lines at a defined spacing. As already shown in FIG. 1a this can be achieved by means of connecting elements or for example directly by means of an adhesive. The bodies can also be advantageously connected together by an adhesive or a foil which is applied to the surface (14) such that there is no adhesive inside the channel. In this case the upper or lower area of the cutting point is not inside the channel that is formed but is a component of the surfaces (14) of the body (10). Hence the cut and rejoined body (10') represents a channel structure having 4 parallel channels of identical shape. Subsequently the second body (11) is connected to the body (10') such that an additional channel (12e) is formed which is joined by the channels (12a–12d). In a final step the assembled bodies (10' and 11) are again cut resulting in four microfluidic structures (13a–13d) whose channels form a T-piece.

Figure 1C:
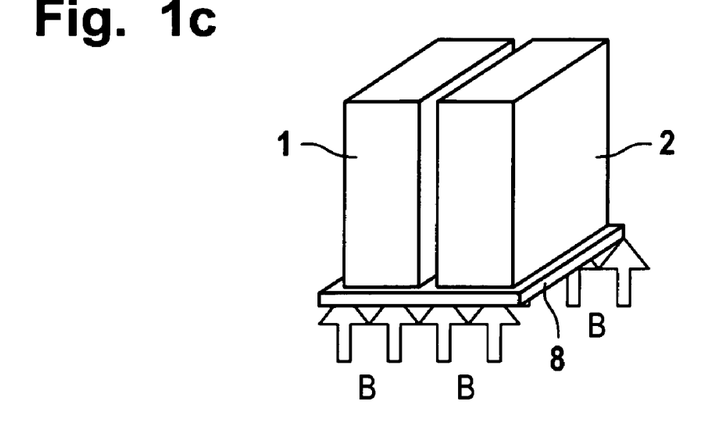
Figure 1D:
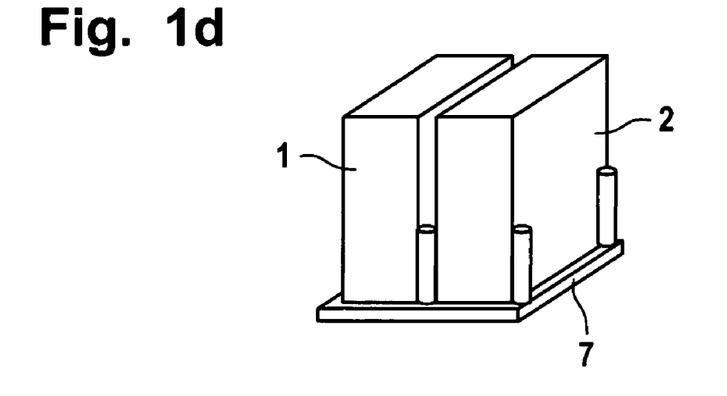
Figure 1E:
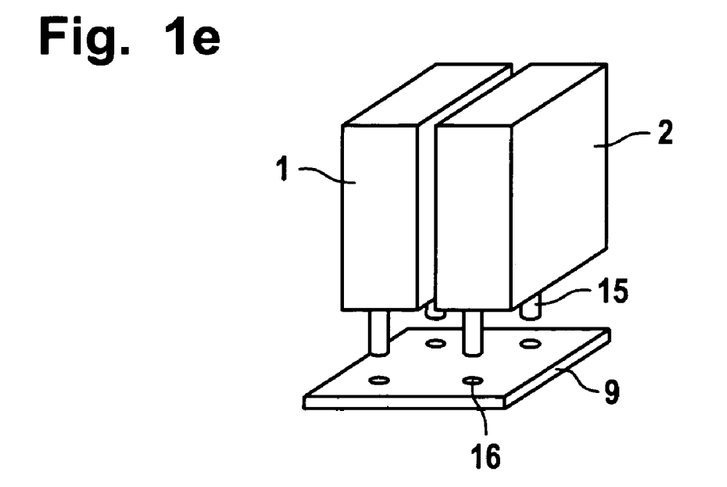

FIGS. 1c–1e show examples of a few other possibilities of how a joining of bodies can be realized and simplified. In this case care must be taken in each case that each connection is designed such that the channel systems are fluidically sealed and a defined distance is guaranteed between the individual surfaces of the bodies. In FIG. 1c two bodies are positioned relative to one another by a strong magnetic field. If the strength of the magnetic field of a magnetic substrate (8) is chosen to be sufficiently high, this ensures an exact positioning of the bodies (1 and 2) on the magnetic substrate (8). An advantage of such a connecting method is among others that a microfluidic system can be rapidly and flexibly assembled. Furthermore, no connecting elements are necessary which each determine a defined channel width of the microstructure.

Positioning by a magnetic field also dispenses with adhesives and thus the associated disadvantages (uniform application of adhesive and inert behaviour of the adhesive towards the fluid) can be circumvented. The channel width of such a linked microfluidic system can be rapidly varied depending on the application requirements without in each case requiring corresponding connecting elements. Furthermore, the structure of the microfluidic system itself is also variable. Thus the system can readily meet and be adapted to changing requirement conditions. However, a prerequisite for connecting the bodies in such a manner is that the bodies themselves are composed of a magnetic material. The higher material costs of such a microfluidic system that may result from this can be compensated by the advantage of multiple applications. Consequently such systems are advantageously not employed for single use but rather for changing analytical methods in laboratories. In this connection the readily reversible assembly of the system also allows a simple cleaning of the individual components.

Another method of connecting bodies together and to position them relative to one another is shown in FIG. 1d. In this case the bodies (1 and 2) are positioned relative to one another by means of a template (7). In this case it is conceivable that, on the one hand, such templates are only used to simplify the manufacturing process and are removed again from the system after the two bodies (1 and 2) have been joined. It is, however, also conceivable that the template (7) is used as a connecting element in the microfluidic system and is integrated into it. Advantages of using a template are that the production process for microfluidic systems can be automated for one channel width in each case. It is additionally conceivable to provide specific templates for different channel widths to simplify the manufacture of the systems. The manufacturing process makes no demands on the material of the bodies so that the selection of materials can be adapted to the respective field of application. This also applies similarly to the positioning of the bodies (1 and 2) by means of a positioning element (9) as shown in FIG. 1e. In this case the bodies are positioned on a positioning element (9) by means of a specified lock and key principle. The manufacturing process requires that a corresponding key element (15) is provided on the respective bodies to enable an interaction with the corresponding elements (16) of the positioning element (9). All manufacturing processes shown in FIGS. 1c to 1e can under certain circumstances dispense with the use of an adhesive when the connections shown between the auxiliary means (7–9) and the bodies (1 and 2) are sufficiently rigid to enable a fluidic sealing. This can for example be achieved among others in that the bodies (1 and 2) are pressed by their own weight sufficiently firmly against the elements (7 and 9), or in the example shown in FIG. 1c are acted on by adequate magnetic forces.

FIG. 2 shows a top and front view of a microfluidic system in which the channels form a T-shape and a filter material is provided to separate a sample in the channel system.

Figure 2A:
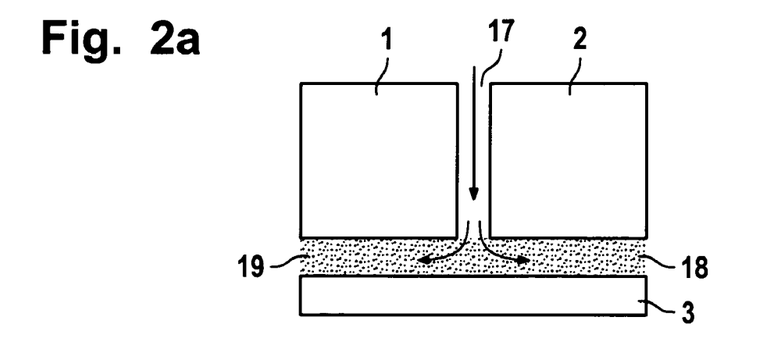
FIG. 2: Microfluidic channel structure in the form of a T-piece with a filter medium.
Figure 2B:
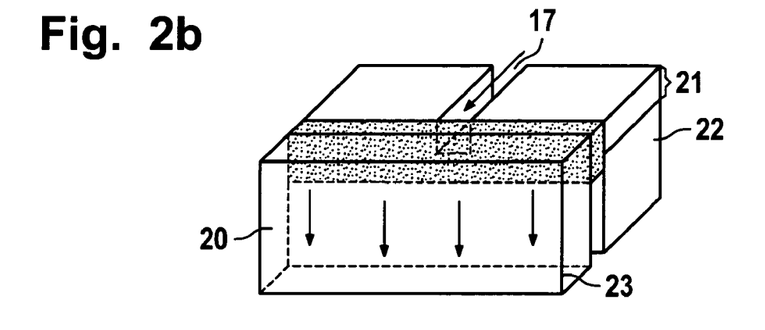

FIG. 2a shows a top view of a channel structure which is formed by the bodies (1–3). In the example shown the fluid is passed through the channel (17) between the bodies (1 and 2) and from there it is conveyed into the crossing channel (18) which is bordered by the bodies (1, 2 and 3). A filter medium (19) is located in the upper area of the channel (18). As the front view of FIG. 2b shows, the depth of the channel (17) is substantially smaller than that of the adjoining channel (18). This can for example be achieved by selecting a correspondingly shorter edge length (21) of the bodies (1 and 2) and connecting the bodies (1 and 2) to a further body (22). However, no channel is formed between the bodies (1 and 2) and body (22), but rather the elements are directly joined. However, it is also conceivable that the edge length of the bodies (1 and 2) is selected to be equal to the edge length (23) of the body (3). In this case the channel depth between bodies (1 and 2) must be correspondingly regulated by means of a connecting element. The connecting element then has a corresponding height which, when added to the edge length (21) corresponds to the edge length (23) of the body (3). The connecting element then advantageously extends over the entire channel length of the channel (17) formed by bodies (1 and 2). The channel (18) that is formed by the bodies (1, 2 and 3) has a substantially higher aspect ratio compared to the channel (17), the channel depth being correspondingly defined by the edge length (23). A filter medium is integrated into the upper area of channel (18). As a result of the different aspect ratios of the two channels, a fluid only flows from the channel (17) into the upper area of the channel (18) in which the filter medium (19) is located. The fluid is then passed through the filter medium (19) and is separated there. In this process a sufficiently high aspect ratio ensures that the fluid is adequately separated by the filter medium. The filtration for example occurs as a result of gravitational force and the filtrate sediments in the lower end of the channel. Consequently such a channel structure also enables small amounts of fluid to be filtered and thus for example enables a separation of substances contained in the fluid. Commercial filter materials may be used in this case as a filter medium depending on the field of application. However, it is also conceivable that the filtration process is due to the choice of the width of the channel itself. In this case the channel width is selected to be so small that only certain fluid components that are intended to be the filtrate can pass through the channel. The adaptation of the channel width to certain fluid components is only one advantageous example of application which, in comparison to the prior art, can be particularly simply realized by the system according to the invention since a constant and defined channel width can be ensured over the entire course of the channel depth. Depending on the field of application it is of course also possible to specifically select a predetermined tapering of the channel along its channel depth. This is achieved for example by selecting different thicknesses for the connecting elements for the upper and lower end of the channel.

Figure 3A:
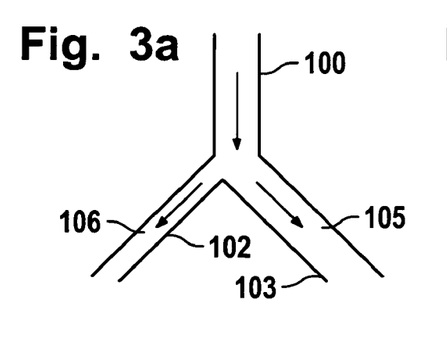
FIG. 3: Microfluidic channel structure in the form of a Y-piece.
Figure 3B:
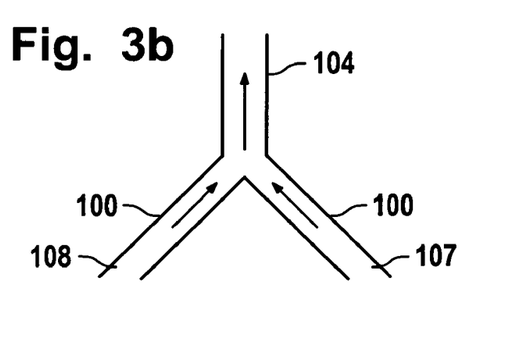
Figure 3C:
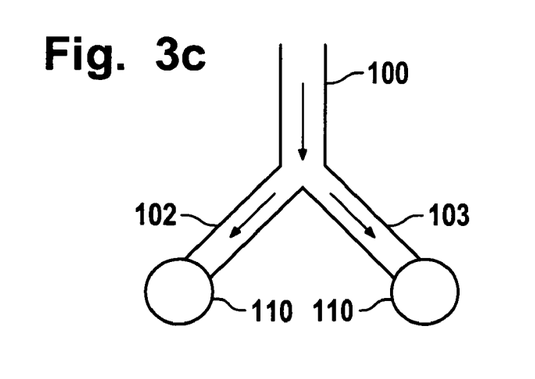

FIG. 3 shows a microfluidic channel system in which the channels are connected together in the form of a Y-piece. As shown in FIG. 3a a fluid is passed in through the channel (100). The fluid flow is divided by the crossing of the channels (102 and 103). The fluid can be separated at the channel crossing for example by the choice of the channel width. In the example shown in FIG. 3a the width of the channel (102) is selected to be smaller than that of the channel (103). Such a channel structure can for example be used to isolate plasma from whole blood or to remove sample components bound to particles. In this case most of the erythrocytes are separated from the blood plasma by the branching of the microchannel. The reduced channel width of the channel (102) separates the erythrocytes from blood plasma at the branching of the channel (100) so that blood enriched in erythrocytes flows along channel (103) whereas blood plasma can be collected from channel (102). For this purpose the channel width of the channel (102) is selected such that it corresponds to a few erythrocyte diameters. In this case the high aspect ratio of the channel structure allows a high volume throughput for plasma separation although the channel width is minimized. This means that the filter capacity in the example shown can be considerably improved by the enlargement of the channel depth. FIG. 3a shows that as a result of the ability to freely select the aspect ratio, it is possible to simply prepare samples without using filter material. Other examples of application are shown in FIGS. 3b and 3c.

In FIG. 3b two different fluids (107 and 108) are passed through the channels (100) and the fluids are intermixed in channel (104). The intermixing of the fluids shows that two different fluids can be rapidly and completely mixed when a large channel depth is selected. This is due to the fact that the two fluids can be in contact along the entire channel depth. The larger this is selected to be, the larger is the contact area of the fluids that are to be intermixed. In order to achieve the same fluid flow in the prior art at a low aspect ratio it would be necessary to select wider channels due to the lower depth. A comparison of the systems makes it rapidly clear that two fluids cannot be completely mixed in the same period when the channel width is larger. As already mentioned in principle two fluids are mixed for example to prepare dilution series, concentration gradients, elution gradients or for example enzyme-substrate mixtures in order to mention only a few examples.

In FIG. 3c the fluid flow runs analogously to FIG. 3a. However, in this case the channels (102) and (103) are each selected to have identical dimensions. In the example shown the channel structure is used to uniformly divide the fluid between the two channels and to transport each to a test field (110). Such an example of application is for example required in order to carry out several test procedures simultaneously on a sample. Of course in principle diverse channel structures in the form of a network are conceivable which would simplify the sample handling. The microstructures according to the invention in this case ensure that simultaneously a separation of a fluid takes place, an intermixing of fluids or a dosed addition or branching of a quantity of fluid during a process sequence. The system according to the invention enables a three-dimensional branching of channels having a high as well as a low aspect ratio. This is of special advantage when highly complex channel networks have to be integrated on small surface areas. In general it turns out that with a given width of a microchannel, an increase in the aspect ratio reduces the time required to completely homogenize or separate two or more flows.

Figure 4:
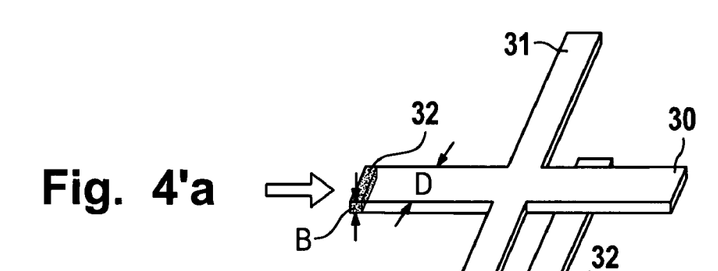
FIG. 4: Microfluidic channel structures with two crossing channels.
Figure 4A:
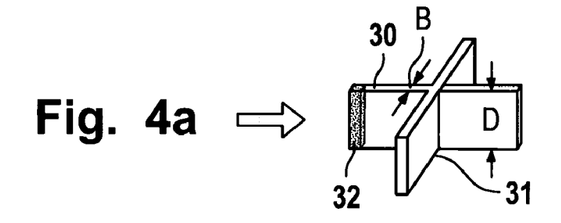
Figures 4B, 4C:
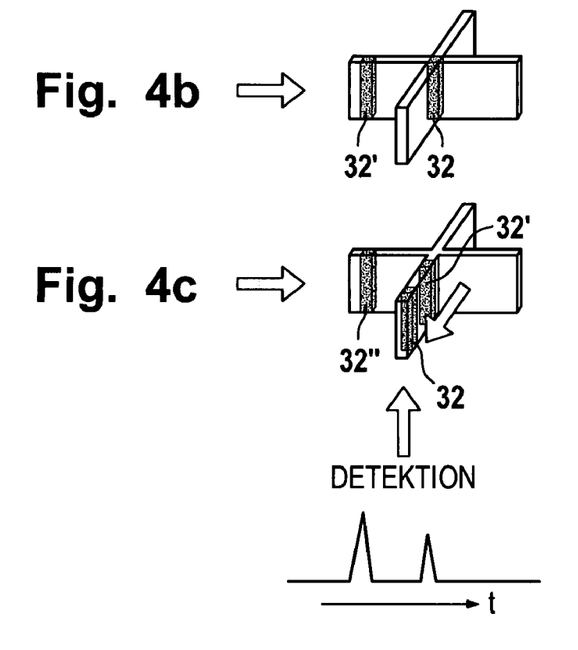

FIGS. 4a and 4b to 4c show an example of the microfluidic channel structure according to the invention with a high aspect ratio compared to a microfluidic channel structure with a low aspect ratio and shows the inventive advantages on the basis of a chromatographic separation process. In order to chromatographically separate two components, a sample (32) is introduced into a microfluidic channel structure. In the example shown the channel structure is formed as a crosspiece. If the sample (32) reaches the channel structure, the sample components are separated, which depending on the separation medium in the respective channel (30 and 31) have a different flow rate. This is illustrated in FIG. 4 by the labelling of the various sample components (32), (32') and (32"). The sample components are transferred into the channel (31) at the branching of the channels (31) and (30). The sample components are measured and identified at the end of the channel (31) by means of a detector.

In separation processes it generally turns out that the degree of separation of two sample components is important for the analysis. Widening of the individual bands of a sample component considerably lowers the degree of separation of two sample components. However, it turns out that the separation of two components in a chromatographic separation channel can be considerably improved when the width of the channel is selected to be as small as possible. In order to nevertheless be able to handle a given sample volume in the same time period, the channel depth must be increased in a corresponding manner when the channel width is reduced. Comparison of FIGS. 4a to 4c and 4' to 4'c illustrates this effect. Assuming laminar flow, a parabolic flow profile forms in the fluidic channel system which reflects the dependence of the flow rate on the position within the channel width. The resulting distribution of the sample components (32) and (32') in the channel (31) is illustrated by the comparison in FIG. 4. When detecting a substance, a widening of the channel results in a widening of the bands assuming a Gauss profile. Thus the comparison shows that the detection of sample components in the channel system according to the invention with a high aspect ratio results in a considerably lower band width of the signals emitted by the detector. As a result the degree of separation of the system is considerably increased. If it is assumed that the degree of separation is constant for a given sample throughput, it is consequently possible to enlarge the applied sample volume.

Figure 5:
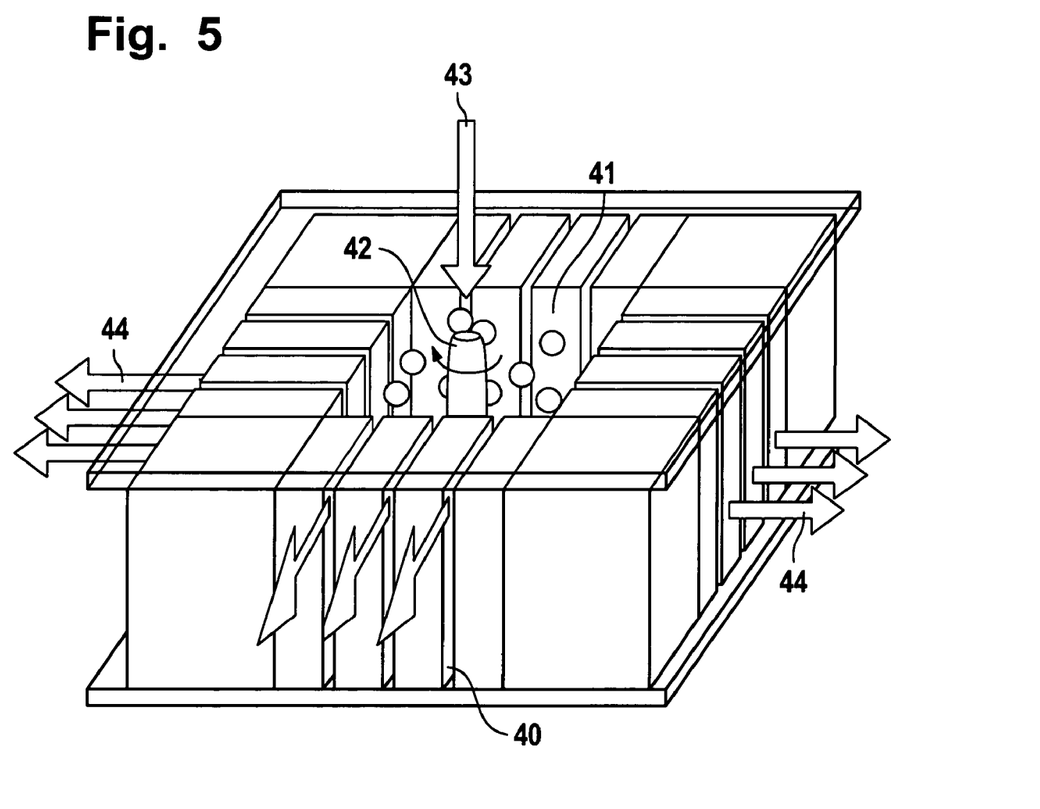
FIG. 5: Microfluidic channel structures with an array of microfluidic channels.

FIG. 5 shows a microfluidic channel structure which can for example be used for automated sample handling. For this purpose several channel arrays (40) are combined in a microfluidic structure. The channel arrays (40) enclose a hollow space (41) in which a suspension is located. A stirrer (42) is present in the hollow space (41) and ensures a permanent mixing of the suspension (43). The suspension is filtered due to the selection of suitable channel widths such that in each case a filtrate (44) reaches the channel exits for further processing. In this case it is for example conceivable that the channel widths of the respective channel arrays are selected to be of different sizes so that filtrates of different qualities corresponding to a subsequent field of application are generated. FIG. 5 illustrates that the system according to the invention allows an automated sample handling even for microfluidic flows. In this connection a wide variety of embodiments of two- or three-dimensional network structures are in principle conceivable. The process according to the invention poses essentially no limitations on the microstructure with regard to shape and materials so that the system can be optimally adapted to the respective field of application. In particular the system and process according to the invention prove to be suitable for fields of application in which channels with a high aspect ratio are advantageous.

What is claimed is:

1. A process for producing a channel system for microfluidic flow having at least three fluidic connections through which a fluid can flow in or out, the system comprising
   joining a first body having at least two surfaces to a second body having at least two surfaces by a first means whereby a first channel is formed between a first surface of each of the first and second bodies and wherein the first channel is fluidically sealed on two edges and has a defined width or distance between the two first surfaces and a defined depth, and
   joining a third body to the first and second bodies by a second means such that a second channel is formed between a first surface of the third body and a second surface of the first and second bodies, wherein the channel is fluidically sealed on two edges and has a defined width and depth, and further wherein the second channel crosses the first channel, thereby providing a system having three fluidic connections, characterized in that the width each channel is less than 1 mm and the ratio of the depth to width of at least one of the channels is greater than 3.

2. The process of claim 1 wherein the depth of the first or second channel is greater than 1 cm.

3. The process of claim 1 wherein one of the joining means is a joining element.

4. The process of claim 3 wherein the joining element comprises an adhesive.

5. The process of claim 3 wherein the joining element comprises a foil.

6. The process of claim 3 wherein the joining element is removed after the bodies have been joined.

7. The process of claim 1 wherein the second channel crossing the first channel essentially forms a T.

8. The process of claim 1 wherein the second channel crossing the first channel essentially forms a Y.

9. The process of claim 1 wherein the second channel crossing the first channel essentially forms a cross.

10. The process of claim 1 wherein at least one of the channels contains a separation medium.

11. The process of claim 1 wherein at least one of the bodies comprises means for regulating temperature of the body.

12. A channel system for microfluidic flow having at least three fluidic connections through which a fluid can flow in or out, the system comprising a first body having at least two surfaces, a second body having at least two surfaces, and a third body having at least two surfaces, wherein the first body is joined to the second body by a first means such that a first channel is formed between a first surface of each of the first and second bodies and wherein the first channel is fluidically sealed on two edges and has a defined width or distance between the two first surfaces and a defined depth, and wherein the third body is joined to the first and second bodies by a second means such that a second channel is formed between a first surface of the third body and a second surface of the first and second bodies, wherein the channel is fluidically sealed on two edges and has a defined width and depth, and further wherein the second channel crosses the first channel, thereby providing a system having three fluidic connections, characterized in that the width each channel is less than 1 mm and the ratio of the depth to width of at least one of the channels is greater than 3.

13. The channel system of claim 12 wherein the depth of the first or second channel is greater than 1 cm.

14. The channel system of claim 12 wherein one of the joining means is a joining element.

15. The channel system of claim 14 wherein the joining element comprises an adhesive.

16. The channel system of claim 14 wherein the joining element comprises a foil.

17. The channel system of claim 14 wherein the joining element is removed after the bodies have been joined.

18. The channel system of claim 12 wherein the second channel crossing the first channel essentially forms a T.

19. The channel system of claim 12 wherein the second channel crossing the first channel essentially forms a Y.

20. The channel system of claim 12 wherein the second channel crossing the first channel essentially forms a cross.

21. The channel system of claim 12 wherein at least one of the channels contains a separation medium.

22. The channel system of claim 12 wherein at least one of the bodies comprises means for regulating temperature of the body.

* * * * *